Jan. 16, 1968  J. B. ERIKSEN  3,363,544
CONVEYOR ARRANGEMENT
Filed Nov. 1, 1966  2 Sheets-Sheet 1
FIG. 1.-
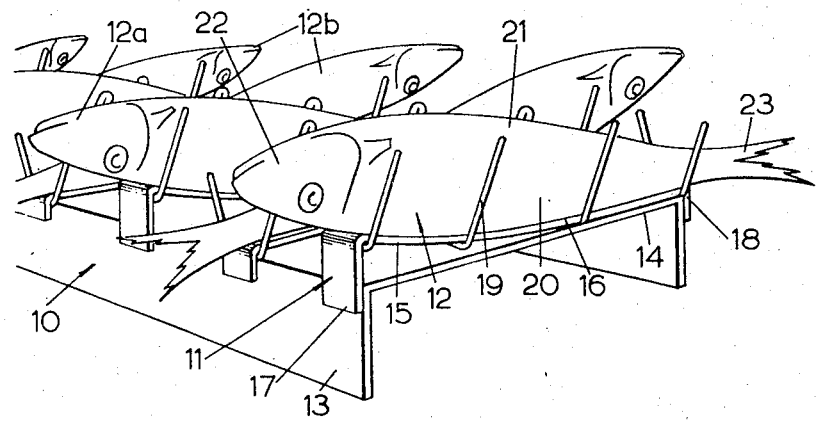
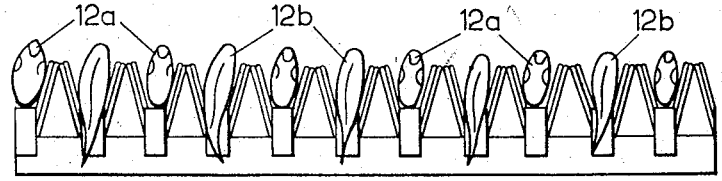
-FIG. 2.-
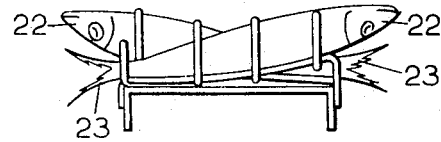
-FIG. 3.-

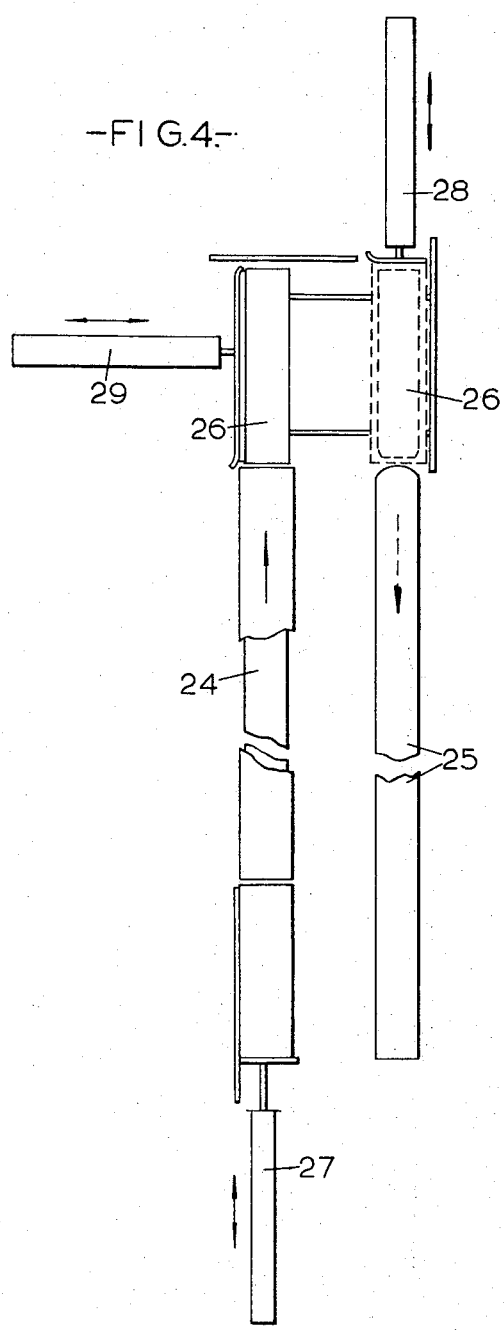

United States Patent Office 3,363,544
Patented Jan. 16, 1968

3,363,544
CONVEYOR ARRANGEMENT
Jan Bergh Eriksen, Stavanger, Norway, assignor to Trio Fabrikker A/S de Forenede Norske Laaseog Beslagfabriker, Stavanger, Norway
Filed Nov. 1, 1966, Ser. No. 591,151
2 Claims. (Cl. 99—426)

This invention relates to a conveyor arrangement and, in particular, to an arrangement for conveying fish on a track to and from special processing stations and/or for supplying fish in a desired position for automatically arranging the fish in packages.

On processing fish in large numbers, for example, on heat-treating fish, it is customary to employ a common conveyor, such as a belt conveyor equipped with beakers in which the fish are able to be placed, alternately, one way or the other. On production and mechanical grounds, it is desirable to use smaller units instead of a continuous conveyor belt of this type.

According to the present invention a conveyor arrangement suitable for conveying fish on a track to and from special processing stations and/or for supplying fish in a desired position for automatically arranging the fish in packages, which comprises a rigid and elongated support unit to an upper portion of which are secured a predetermined number of holders arranged in series in substantially parallel side-by-side relationship and transversely of the longitudinal axis of the support, each holder being adapted to support a fish in a definite position with its head disposed at a higher level than its tail, alternate fish having their heads pointing in one direction while the remainder have their heads pointing in the reverse direction.

Preferably, the support unit is of channel shape, the channel being directed downwards so as to permit axial displacement of the support unit on a bed of a particular track.

Holders which each consist of a downwardly concave plate strip for supporting the back of the fish and from which spaced supports extend obliquely upwards from the sides thereof, have proved to be especially suitable.

The conveyor arrangements of the present invention are easy to move on a particular track and are easy to transfer from one track to another with alternately continuous and intermittent operation. In addition, the fish is able to be processed in a ready and simple manner.

In order that the invention can be more readily understood, a convenient embodiment thereof will now be described, by way of example, with reference to the accompanying drawings in which:

FIGURE 1 is a perspective view of a section of the conveyor arrangement constructed in accordance with the invention, FIGURE 2 is a side view of the conveyor arrangement shown in FIGURE 1, FIGURE 3 is an end view of the conveyor arrangement, and FIGURE 4 is a diagrammatic plan view, partly broken away, of a track arrangement for conveying a set of support units in a U-shaped track.

Referring to FIGURES 1 to 3, the conveyor arrangement consists of a rigid support unit 10 of inverted channel shape having a series of mutually parallel holders 11 which extend transversely of the longitudinal axis of the support unit and which are adapted to carry fish 12 in a desired position on a particular track. Such support units have many advantages compared with continuous conveyor belts, but are especially advantageous for conveying fish which is to be or which has been heat treated at a certain stage of the conveying operation. The track can consist in a manner known per se of several longitudinal tracks which are connected to one another by means of transverse transfer arrangements. The support units rest with vertically and downwardly directed flanges 13 or with a central web 14 against the bed of the track. By means of the flanges 13, lateral control of the support units is achieved in a known manner by engagement with the track and/or the advancing arrangements.

The holder 11 is formed from a metal strip 15 having a downwardly concave central portion 16 and two vertically and downwardly cranked end flaps 17 and 18 and roughly V-shaped hoops 19 which extend from the bottom side of the central portion 16 obliquely upwards on each side of the metal strip. The holder is adapted to receive the fish 12 with the back 20 of the fish resting against the central portion 16 and with the abdomen 21 of the fish directed upwards. By means of the central portion 16, an effective support for the back portion of the fish is obtained, something which can be especially worthwhile after the fish are heat treated and can thereby be relatively "brittle" with little self-support. By reason of the subsequent arrangement of the fish in packages, alternate fish are placed as shown at 12a with the head directed in the one direction, while the remaining fish as shown at 12b have the head in the opposite direction. It has proved advantageous in practice, especially for the automatic arranging, that the heads of the fish are disposed at a higher level than the tails of the fish. This is achieved by placing one end portion of the metal strip at the end flap 17, at a higher level than the end portion at the end flap 18. The central portion 16, which forms an abutment for the back of the fish, is dimensioned such that the head 22 and tail 23 of the fish can project outside the holder at each end of the latter. The fish 12 is supported laterally and just inside the head and tail and at intermediate local portions by means of the hoops 19 which are positioned at such a distance from one another that easy access is provided for engaging means which are to transfer the fish from the conveyor arrangement to the package into which the fish is to be packed.

In FIG. 4 there is shown a track for support units comprising two parallel slideways 24 and 25 and an intermediate transverse conveying means 26 arranged in U-shape in one plane. The slideways 24 and 25 consist of rails and each support unit is resting on the top of the respective rail with its central web and with the flanges guided along vertical side portions of the rail. The conveying means 26 consists of a separate rail portion movable in a reciprocating movement towards and away from the rails 24 and 25 and into alignment therewith. The advancing means consist of three cooperating pneumatic rams 27, 28 and 29. The rams 27 and 28 are moving separately a row of support units intermittently along the respective slideway over a distance corresponding to the length of the support unit. The ram 29 is moving the rail portion 26 from the position shown in full lines to the position in dotted lines in FIG. 4 in the interval between the movement of the ram 27 and the movement of the ram 28, and vice versa in the interval between the movement of the ram 28 and the movement of the ram 27. In the position shown in full lines in FIG. 4 the ram 27 is moving a support unit from the rail 24 onto the rail portion 26 and in the position shown in dotted lines the ram 28 is moving a support unit from the rail portion 26 onto the rail 25.

By means of the aforementioned conveyor arrangement there is obtained firstly a reliable and effective support for the fish during transportation and preparation of the fish. Secondly, it permits ready and reliable preparation and transfer of the fish to their packages and thirdly, an effective engagement with the fish, which is easy to obtain and to raise by vertical displacement.

What I claim is:

1. A tray for the support of fish, said tray comprising a rigid and elongated support unit of channel shape with downwardly depending flanges, and a plurality of holders secured to said unit and extending thereabove, said holders being arranged in series in substantially parallel side-by-side relationship and extending transversely to the longitudinal axis of the support unit, each holder including a downwardly concave plate strip for supporting the back of a fish and spaced supports extending obliquely upwards from said strip at opposite sides thereof, said holders being inclined relative to the support unit to support a fish in a definite position with its head disposed at a higher level than its tail, alternate holders being inclined in opposite directions with the fish therein pointing in opposite directions.

2. A tray as claimed in claim 1 wherein said spaced supports are rods.

References Cited

UNITED STATES PATENTS

| | | | |
|---|---|---|---|
| 2,382,729 | 8/1945 | Kurzbin | 53—142 |
| 2,704,594 | 3/1955 | Gorby | 198—131 |
| 2,828,794 | 4/1958 | Baumann. | |

FOREIGN PATENTS

| | | |
|---|---|---|
| 1,161,630 | 3/1958 | France. |
| 356,400 | 8/1914 | Germany. |
| 25,479 | 2/1915 | Norway. |

EVON C. BLUNK, *Primary Examiner.*

R. J. HICKEY, *Assistant Examiner.*